United States Patent [19]
Hopkins et al.

[11] Patent Number: 5,678,105
[45] Date of Patent: Oct. 14, 1997

[54] CAMERA SHUTTER AND FOCUS LENS ASSEMBLY

[75] Inventors: Patrick W. Hopkins, Burlington; Norman D. Staller, Beverly, both of Mass.

[73] Assignee: Polaroid Corporation, Cambridge, Mass.

[21] Appl. No.: 576,777

[22] Filed: Dec. 21, 1995

[51] Int. Cl.$^6$ .............................. G03B 9/08; G03B 1/18
[52] U.S. Cl. .............................................. 396/463; 396/490
[58] Field of Search ........................... 354/195.1, 195.12, 354/234.1; 396/463, 490

[56] References Cited

U.S. PATENT DOCUMENTS

| | | | |
|---|---|---|---|
| 4,192,587 | 3/1980 | LaRocque et al. | 354/27 |
| 4,199,244 | 4/1980 | Shenk | 354/195 |
| 4,278,340 | 7/1981 | Toyama | 354/195 |
| 4,325,614 | 4/1982 | Grimes | 354/23 |
| 4,354,748 | 10/1982 | Grimes et al. | 354/23 |
| 4,426,145 | 1/1984 | Hashimoto | 354/195.1 |
| 4,427,276 | 1/1984 | Feinerman et al. | 354/412 |
| 4,505,567 | 3/1985 | Hirohata et al. | 354/403 |
| 4,610,523 | 9/1986 | Tsuboi | 354/195.1 |
| 4,696,559 | 9/1987 | Kondo | 354/403 |
| 4,799,077 | 1/1989 | Kaplan et al. | 354/400 |
| 5,032,859 | 7/1991 | Akimoto et al. | 354/195.1 |
| 5,177,523 | 1/1993 | Huang et al. | 354/400 |
| 5,365,301 | 11/1994 | Sugita et al. | 354/400 |

*Primary Examiner*—Cassandra C. Spyrou
*Assistant Examiner*—Daniel Chapik
*Attorney, Agent, or Firm*—Leslie Payne

[57] ABSTRACT

A camera shutter and focus lens assembly includes a rotary motor having a central shaft, and a rotary beam actuator connected to the shaft. A moveable focus lens, a first shutter blade, and a second shutter blade are in mechanical communication with the actuator beam. Rotation of the shaft by the motor operates to cause movement of the focus lens to effect a selected focusing relationship between the focus lens and a fixed lens proximate thereto, and further operates to cause movement of the first and second shutter blades to cause the shutter blades cooperatively to define an opening to permit light to pass therethrough.

3 Claims, 19 Drawing Sheets

CAMERA SHUTTER AND FOCUS LENS ASSEMBLY

BACKGROUND OF THE INVENTION

1. Field of the Invention

This invention relates to cameras and is directed more particularly to a shutter and focus assembly for a camera.

2. Description of the Prior Art

Cameras employing shutter blade mechanisms and lens mechanisms that may be focused automatically, in accordance with a rangefinder-determined camera-to-subject distance, are well known in the art. A camera employing a scanning blade shutter and a lens mechanism responsive to a range-finder-determined subject distance signal is described in U.S. Pat. No. 4,192,587, issued Mar. 11, 1980, in the name of A. G. LaRocque, et al.

Scanning shutter blade mechanisms normally are driven from a scene light-blocking position toward a maximum aperture defining position and back to the scene light-blocking position during an exposure interval. Such scanning shutter blade mechanisms generally comprise a pair of scanning shutter blade elements, each having a primary aperture therethrough. The shutter blade elements overlap for reciprocal movement with respect to each other. Such movement drives the primary apertures into overlapping relationship with each other so as to define a progressively increasing, and then decreasing, effective primary aperture. The shutter blade mechanisms normally are driven by a spring and solenoid arrangement, as disclosed in LaRocque, et al., supra, or by a microcomputer controlled stepper motor incorporating a digitally encoded scanning blade position sensor as shown, for example, in U.S. Pat. No. 4,325,614, issued Apr. 20, 1982, in the name of D. L. Grimes.

Autofocus cameras of the aforementioned type generally embody a motor driven objective lens mechanism which must be stopped at an appropriate focal position corresponding to a previously determined camera-to-subject distance. In such cameras, it is desirable to provide a lens position encoder system to identify the instantaneous focal position of a lens element driven by the lens mechanism as the lens element is moved through its plurality of different focal positions, in order to precisely position the lens element at a previously determined object distance related focal position, as disclosed, for example, in LaRocque, et al., supra.

In prior adjustable objective lens cameras employing scanning shutter blades, the objective lens and the shutter blades are driven by either a common drive that sequentially drives the objective lens and the shutter blades, or are driven by separate shutter blade drive means and lens drive means. U.S. Pat. No. 4,278,340 to Yogama, et al., is an example of a sequential lens and shutter drive, and U.S. Pat. No. 4,199,244 to Shenk is an example of a camera employing separate shutter blade and lens drives.

In U.S. Pat. No. 4,799,077, to Kaplan et al. issued Jan. 17, 1989, there is disclosed a single drive for a camera, the drive having facility for driving the movable element of an adjustable focus lens to a previously determined lens focal position, and for driving a scanning blade type of shutter mechanism during an exposure interval. The shutter is directly coupled to the single drive and the objective lens mechanism is coupled to the single drive through a drive link assembly. Activation of the single drive moves an initially open shutter mechanism toward its closed position and moves the objective lens mechanism toward a previously determined lens focal position. Means coupled to the drive link assembly and responsive to a signal representative of the previously determined camera-to-subject distance, actuates the drive link assembly to uncouple the objective lens mechanism from the single drive, which subsequently moves the shutter mechanism to its fully closed position prior to initiation of a film exposure interval. The drive link assembly connection between the single drive and the objective lens mechanism is reestablished subsequent to a film exposure interval, to enable the single drive to return the objective lens mechanism to its initial focal position, while moving the shutter to its initial open position.

While the single drive mechanism of the '077 patent has proven useful, the mechanism requires that the objective lens mechanism be uncoupled from the drive mechanism while the drive mechanism is moving the shutter mechanism and subsequently be recoupled to the drive mechanism. The uncoupling and re-coupling of the objective lens and drive mechanism is dependent upon signals from a coupling operator which, in turn, receives signals from an exposure and focus control unit which, in turn, receives signals from a host of sources.

Accordingly, there is a need for a camera shutter and focus lens assembly wherein a single drive means is mechanically connected to the shutter mechanism and to the focus lens mechanism, and is adapted to drive both the shutter and lens components substantially simultaneously, with a minimum of electronic signal input. There is further a need for such an assembly as may be of modular construction, so as to find utility, as a unit, in a number of different cameras.

SUMMARY OF THE INVENTION

It is, therefore, an object of the present invention to provide a camera shutter and focal lens assembly including a single drive means mechanically connected to the shutter mechanism and to the focal lens mechanism, and capable to drive both mechanisms substantially simultaneously.

A further object of the invention is to provide such an assembly requiring a minimum of electronic inputs.

A still further object of the invention is to provide such an assembly in modular form, such that said assembly, as a whole, may be adapted for use in a number of different camera designs.

With the above and other objects in view, as will hereinafter appear, a feature of the present invention is the provision of a camera shutter and focus assembly, the assembly including a rotary motor having a central shaft, a rotary beam actuator connected to the shaft, and a focus lens, a first shutter blade, and a second shutter blade in mechanical communication with the beam actuator. Rotation of the shaft by the motor operates to rotate the beam actuator to cause movement of the focus leas to effect a selected focusing relationship between the focus lens and a fixed lens proximate thereto, and movement of the first and second shutter blades to cause the shutter blades cooperatively to define an exposure opening to permit light to pass therethrough.

In accordance with a further feature of the invention, there is provided a camera shutter and focus assembly, the assembly including a rotary motor having a central shaft, and rotary beam actuator connected to the shaft. A moveable focus lens is in mechanical communication with the beam actuator. A first shutter blade is in mechanical communication with the beam actuator, as is a second shutter blade. Upon rotation of the shaft by the motor, and thereby rotation of the beam actuator, in a first rotative direction, there is caused linear movement of the focus lens relative to a fixed lens proximate thereto, to effect a selected focusing relationship between the focus lens and the fixed lens. Upon rotation of the shaft by the motor, and thereby rotation of the actuator in a second rotative direction, there is caused linear movement of the first and second shutter blades in opposite directions to cause the first and second shutter blades cooperatively to define an opening to permit light to pass therethrough.

In accordance with a still further feature of the invention, there is provided a camera shutter and focus assembly, the assembly including a housing, a motor fixed to the housing, the motor having a central shaft extending into the housing, and a beam actuator connected to the shaft. The assembly further includes an adjustable focus lens mounted in the housing and in mechanical communication with the beam actuator, and a shutter blade mechanism mounted in the housing and in mechanical communication with the beam actuator. Rotative movement of the motor shaft causes rotative movement of the beam actuator which, in turn, causes movement of the focus lens relative to a fixed lens adjacent thereto, and movement of the shutter blade mechanism to effect a shutter operative cycle.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings

DESCRIPTION OF THE PREFERRED EMBODIMENT

Figure 1A:
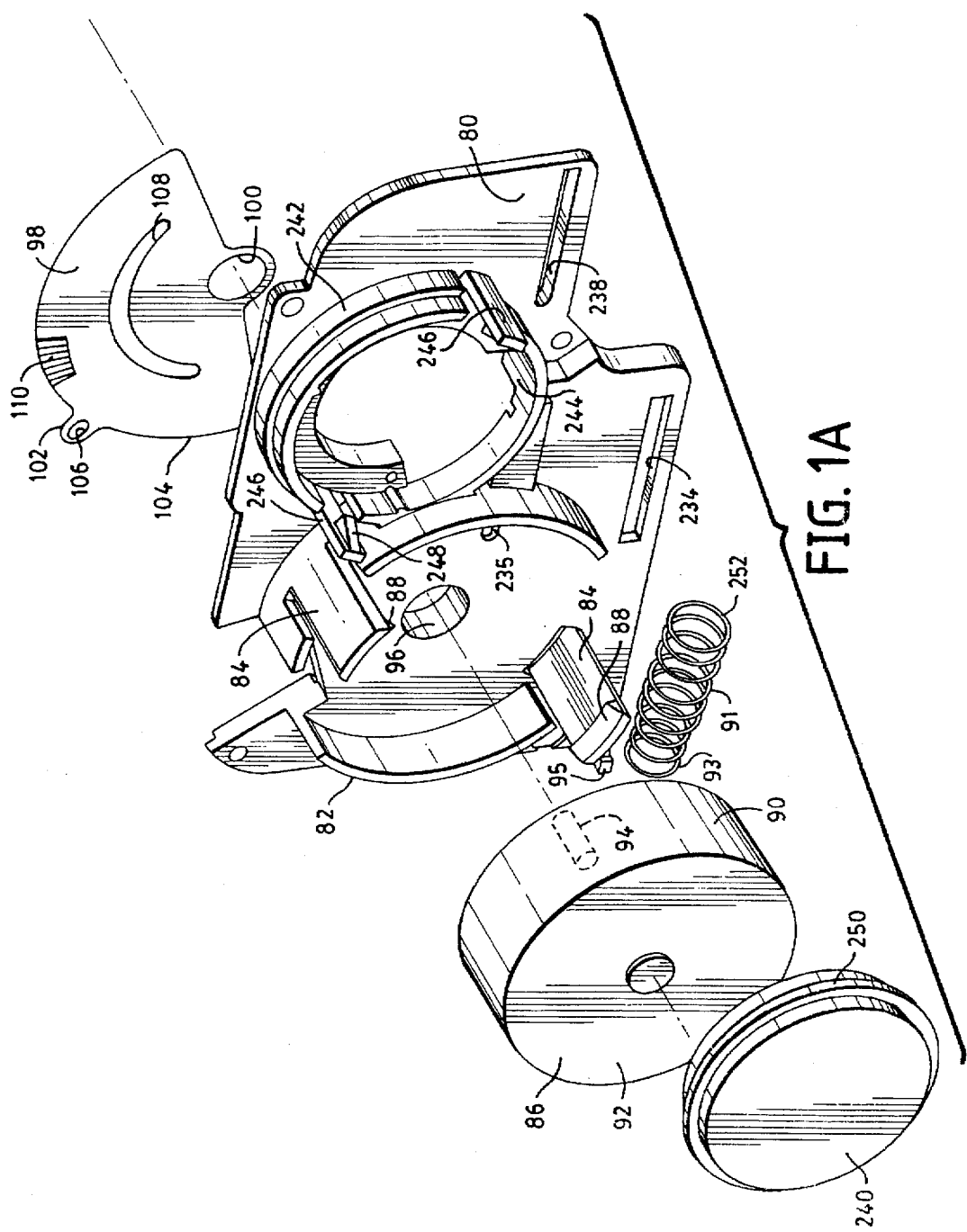
FIGS. 1A–1C are exploded perspective views of a camera shutter and focus lens assembly illustrative of an embodiment of the invention.
Figure 1B:
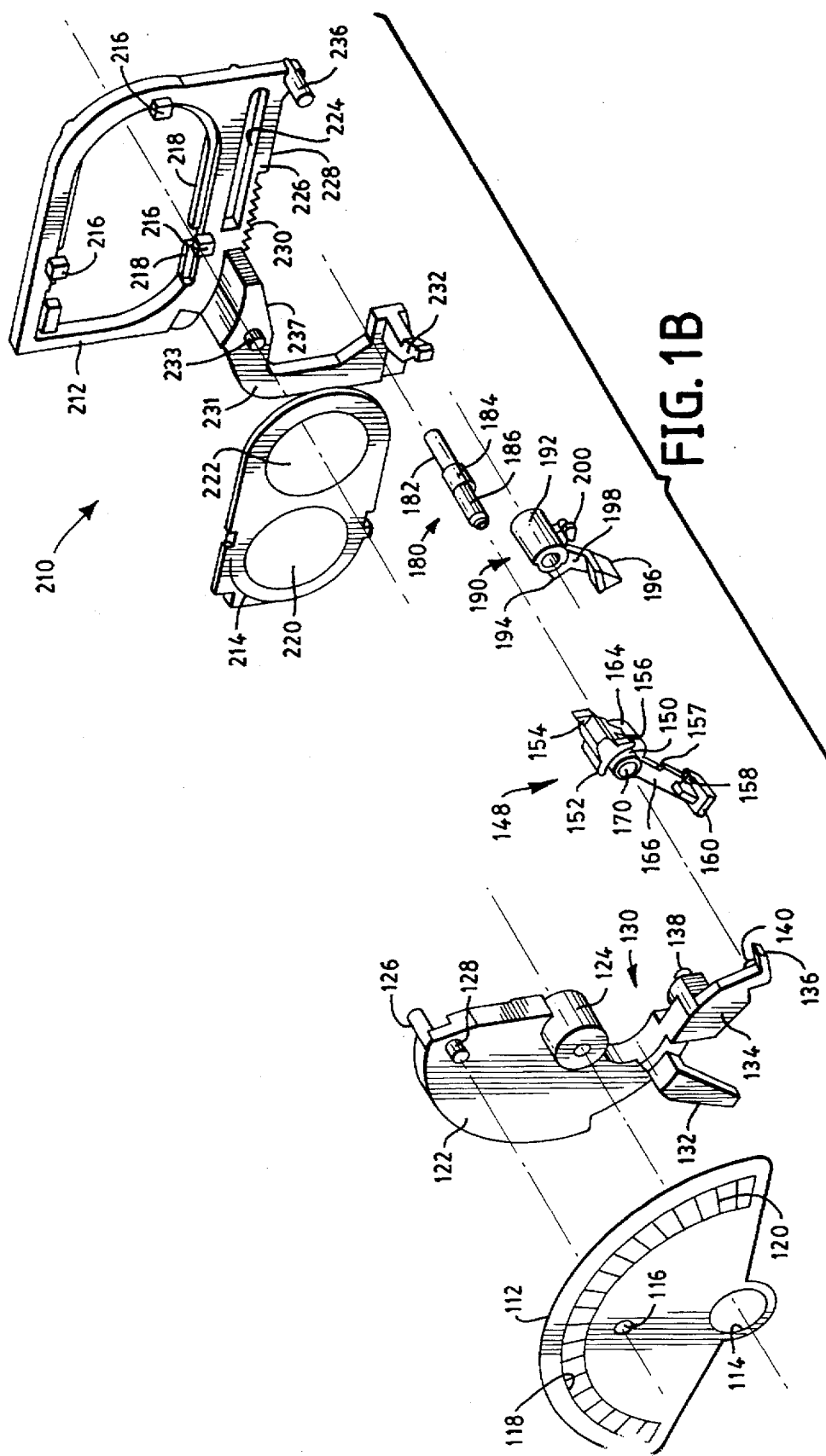
Figure 1C:
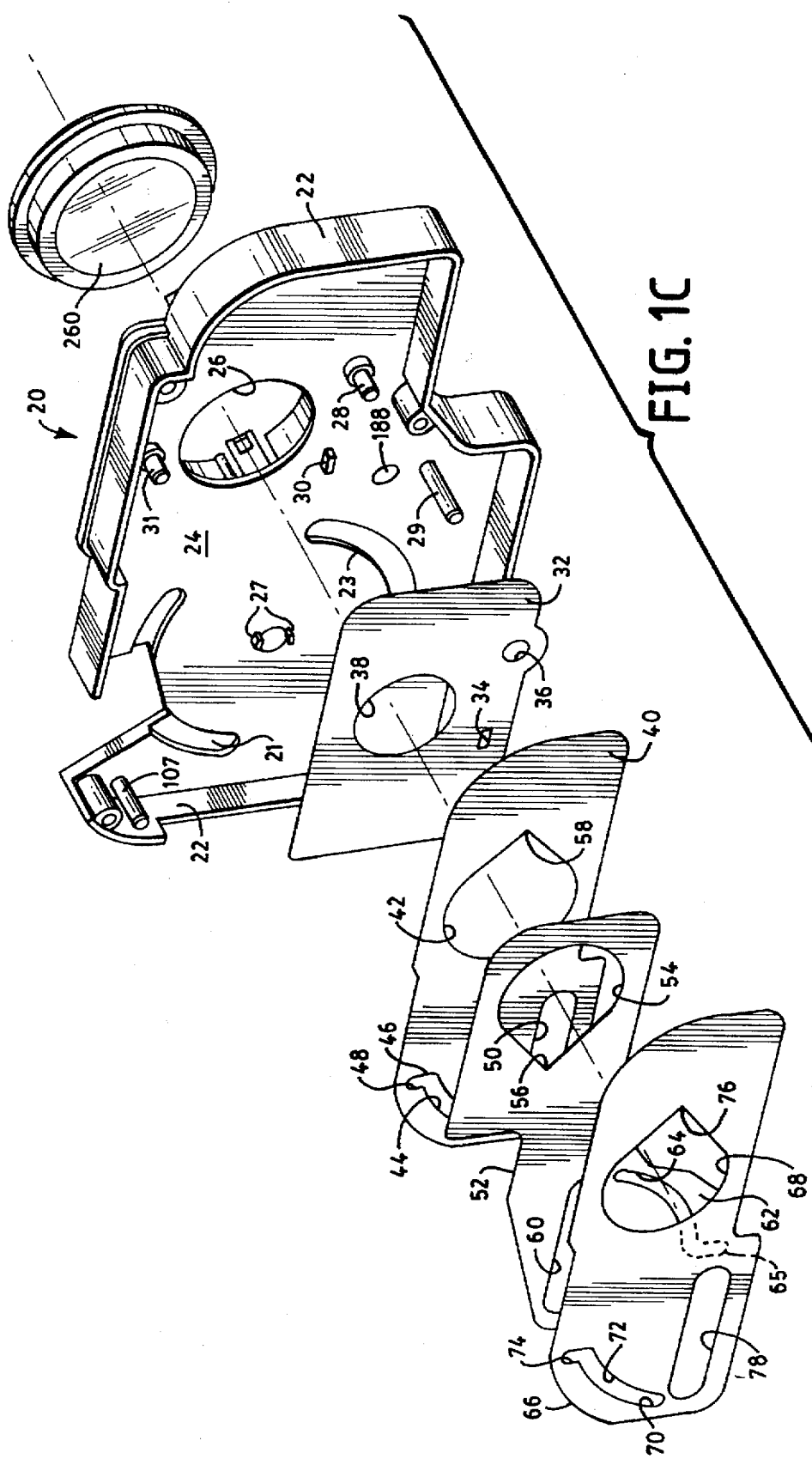

Referring to FIGS. 1A–1C, it will be seen that the camera shutter and focus assembly includes a housing 20 substantially hounded by a side wall 22 upstanding from a rear surface 24. The housing 20 is provided with an opening 26 therein, a pin 28 extending forwardly from the rear surface 24, a projection 30 extending forwardly from the rear surface 24, and a pair of arcuate blind grooves 21, 23. The housing 20 is further provided with a pair of locating tabs 27 and a pin 29 extending forwardly from the rear surface 24. An optical stop plate 32 is fixed to the housing 20, the stop plate 32 having a rectangular opening 34 therein adapted to snugly receive the projection 30, and an orifice 36 therein adapted to receive the pin 28, such that the optical plate 32 is fixed to the rear surface 24 of the housing 20. The optical stop plate 32 includes an aperture 38 aligned with the housing opening 26. The optical stop 32 is replaceable in order to allow different maximum aperture values to be used.

A shutter opening blade 40 is disposed adjacent to the optical stop plate 32 and has therein a first tear-shaped orifice 42 and a curved groove 44 which, at an upper end 46 thereof, joins a vertical groove 48. Each blade orifice opening is a combination of one-half of a 90 degree diamond and one-half of a circle. These shapes (42, 54,68) oppose each other on opposing blades. The shutter opening blade 40 further includes a straight closed-end horizontal groove 50 which rides on the locating tabs 27 of the housing 20.

Adjacent the shutter opening blade 40 is a right shutter opening blade 52 having therein a second tear-shaped orifice 54 with a point 56 of the orifice 54 facing leftwardly, as viewed in FIG. 1C, opposite to a point 58 of the first tear-shaped orifice 42 of the shutter opening blade 40. The right shutter opening blade 52 is provided with a straight closed-end horizontal groove 60, which rides on the locating tabs 27 of the housing 20. The right shutter opening blade 52 is further provided with a depending flange portion 62 having therein a closed-end curved groove 64 which, at a lower end thereof, joins a vertical groove 65.

Next to the right shutter opening blade 52 is a left shutter opening blade 66 having therein a third tear-shaped orifice 68 and a curved groove 70 which, at an upper end 72 thereof, joins a vertical groove 74. A point 76 of the orifice 68 faces rightwardly, as viewed in FIG. 1C, similar to the orifice 42 and oppositely to the orifice 54. The left shutter opening blade 66 is provided with a straight closed-end horizontal groove 78, which rides on the locating tabs 27 of the housing 20.

Figure 2:
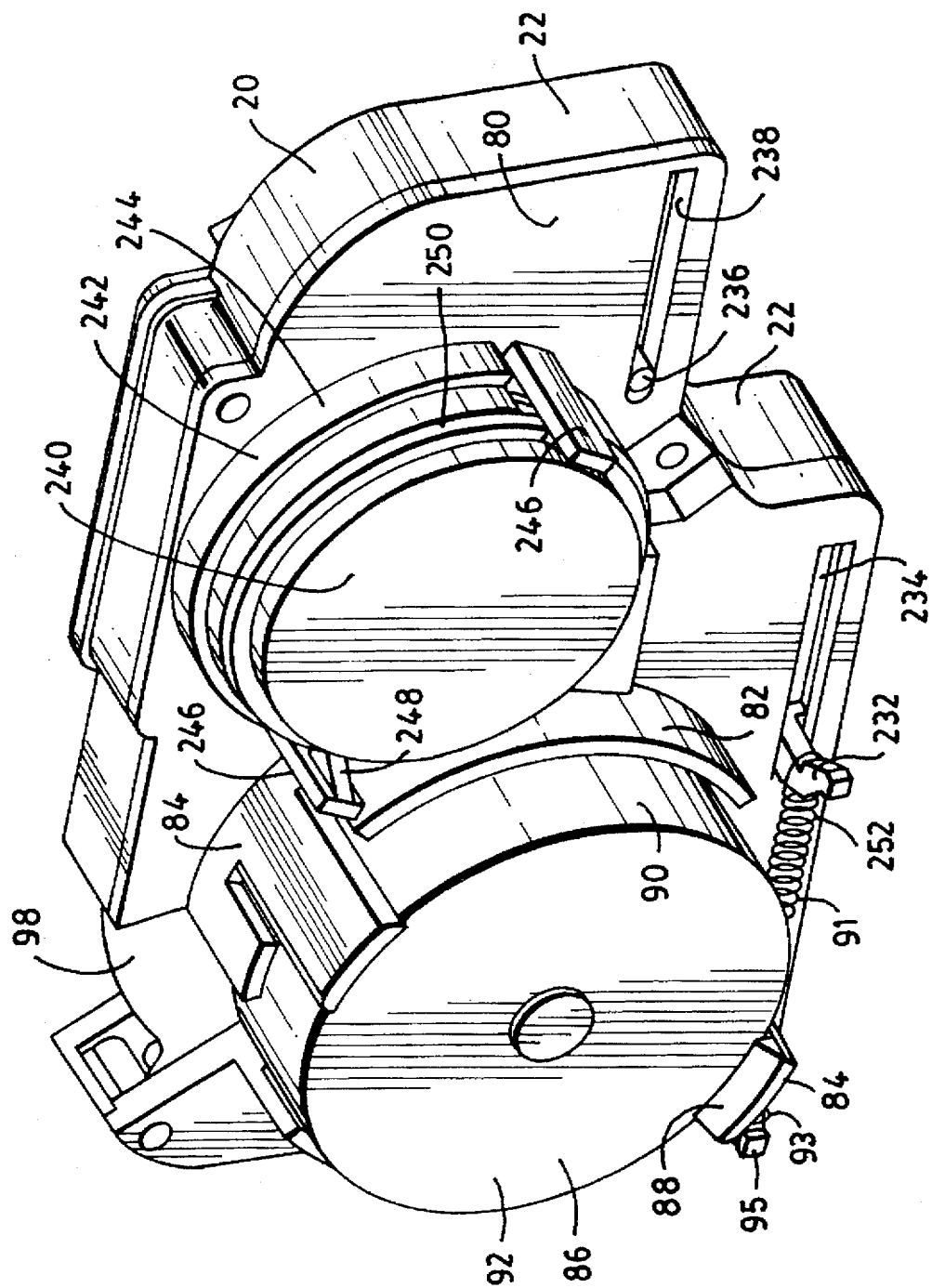
FIG. 2 is a generally frontal perspective view of the camera shutter and focus lens assembly of FIGS. 1A–1C, when fully assembled.

With reference to FIG. 1A, it is seen that the assembly illustrated therein includes a front plate 80 having thereon an upstanding circular wall 82 and a pair of leaf springs 84 adapted to receive and retain an electric motor 86. The motor 86 fits snugly within the wall 82. The leaf springs 84 are provided with inwardly-directed projections 88 which, in assembly, ride along a side wall 90 of the motor 86 and snap into place over a front face 92 of the motor 86 to lock the motor in place (FIG. 2). The motor 86 turns a central shaft 94 which is disposed in, and extends through, a hole 96 in the front plate 80. An extension spring 91 is connected at a first end 93 to a spring retainer 95 extending forwardly from the front plate 80.

Fixed to the housing 20 is an encoder mask 98 having therein a hole 100. A tab 102 extends outwardly from a curve periphery 104 and has therein an opening 106 by which the encoder mask 98 is fixed to the housing 20 by engagement with a pin 107 extending forwardly from the surface 24. The encoder mask 98 is provided with a curved slot 108. The encoder mask 98 is of a semi-rigid plastic sheet material which is darkened but which is provided with an accurate transparent window 110 on the curved periphery 104 thereof.

Mounted adjacent the encoder mask 98, is an encoder sheet 112 (FIG. 1B) having therein a hole 114. The encoder sheet 112 is of a semi-rigid plastic sheet material, and is provided with an orifice 116 and an arcuate window 118 having encoder markings 120 thereon.

Fixed to the motor shaft 94 and adjacent the encoder sheet 112 is a beam actuator 122, which includes a hub portion 124 in which is fixed the motor shaft 94. The hub portion 124 extends forwardly, and mounted thereon are the encoder sheet 112 and encoder mask 98. The beam actuator hub portion 124 extends into the front plate hole 96 and extends through the holes 100 and 114. A post 126 extends rearwardly from the beam actuator 122 and is disposed in the curved groove 70 on the left shutter opening blade 66 and the curved groove 44 of the shutter opening blade 40, and rides in the blind groove 21 of the housing 20. A pin 128 extends forwardly from the beam actuator 122 and is lodged in the orifice 116 of the encoder sheet 112.

The beam actuator 122 includes a leg portion 130 having thereon a lug 132 extending forwardly and downwardly from the beam actuator 122, as shown in FIG. 1B, and a projection portion 134 having at a distal end thereof a flange 136 and having extending rearwardly therefrom a pivot pin 138 and a boss 140. The pivot pin 138 rides in the blind groove 23 of the housing 20 and in curved groove 64 on blade 52.

A pawl 148 is provided with a top hub portion 150 and a base hub portion 164 with a through-all center hole 170. At one end of the pawl 148 are the reset cam protrusion 152, the focus cam detent tooth 154 and a spring hook 156 for retaining the pawl torsion spring. An arm portion 166 extends from the lower portion of the base hub 164. On one side of the arm portion 166 is a latching notch 157 and at the end thereto is an enlarged flat area 158 supporting an L-shaped flange 160. The pawl 148 is mounted on a post 180 that is integrated into the housing 20. The post extends through the hole 170 in both the top hub and the bottom hub 164.

Figure 3:
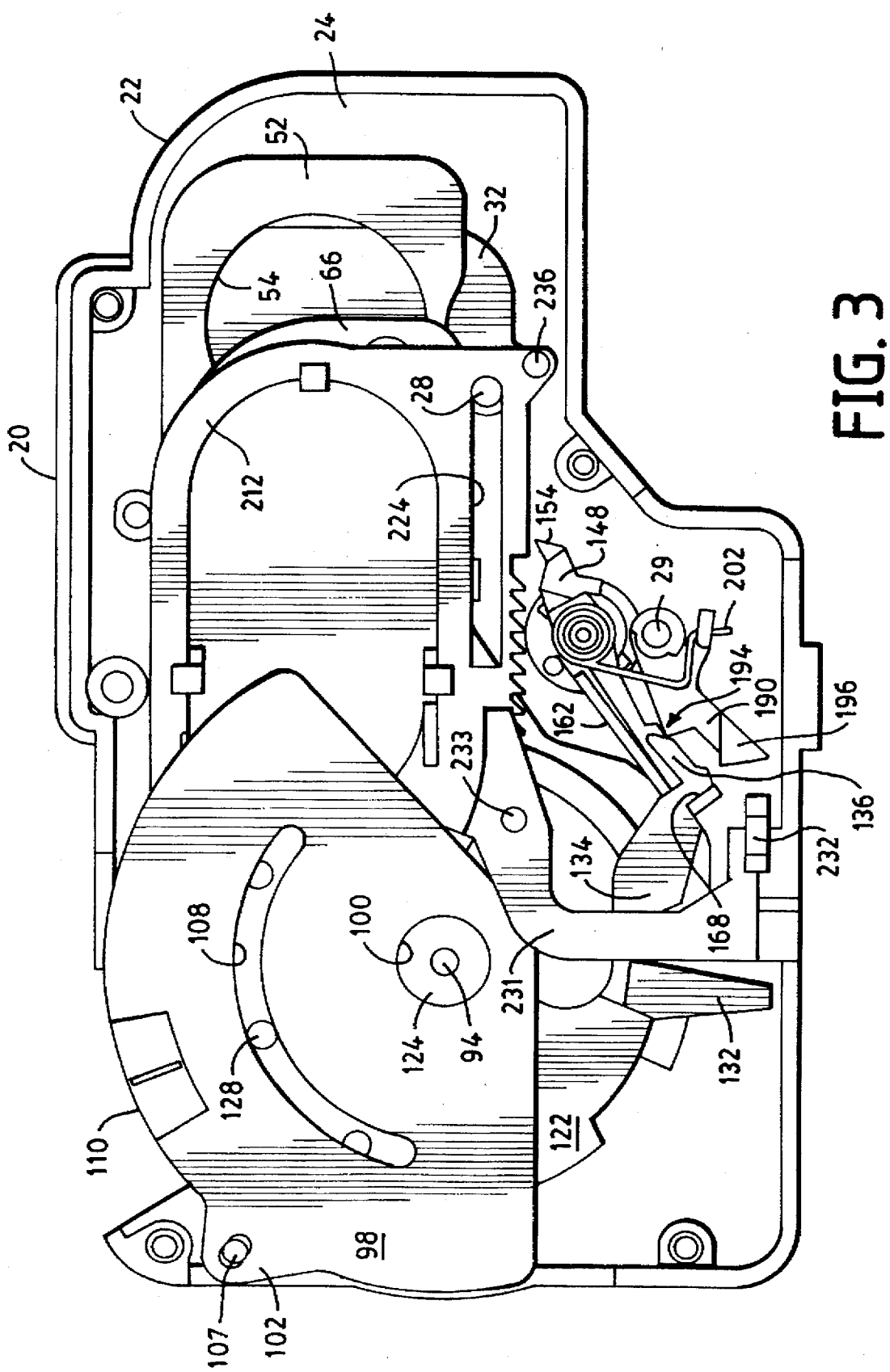
FIG. 3 is a front elevational view of the assembly of FIG. 2 with the front cover removed.

Proximate the pawl 148 and the post assembly 180, is a pawl latch 190, which is pivotally mounted on housing pin 29. The pawl latch 190 includes a hub portion 192, by which the pawl latch 190 is mounted on the pin 29, a latching tip 194, and latch release cam portion 196 at the distal end of an arm portion 198 extending from the hub portion 192 and from which extends the latching tip 194. Also extending from the arm portion 198 is a wire spring retainer portion 200, adapted to retain an end of a wire spring 202 (FIG. 3).

Rearwardly of the beam actuator 122 in the shutter and focus lens assembly shown in FIG. 1B, is a moving lens assembly 210 including a frame portion 212 and a lens element portion 214. The frame portion 212 is provided with inwardly-directed detents 216 and ribs 218 which serve to capture the lens element portion 214 in the frame portion 212. The lens element portion 214 is provided with first and second lens elements 220, 222. The lens assembly 210 has only two zones 220, 222. However, the lens assembly 210 has been designed to provide motion for ten zones.

The frame portion 212 is provided with a straight elongated slot 224 in a lower portion 226 of the frame 212. Along an outer edge 228 of the lower portion 226 of the frame 212, the frame is provided with ratchet teeth 230. The number of ratchet teeth 230 correspond to the number of possible shutter focus zones. An arm 231 depends from the frame lower portion 226 and at a distal end thereof there extends forwardly a spring hook projection 232 which extends through a slot 234 in the front plate 80. The spring hook projection 232 has connected thereto a second end 252 of the extension spring 91. The frame lower portion 226 is further provided with a forwardly extending pin 236 which is movable In a slot 238 in the front plate 80. The frame lower portion arm 231 is provided with a forwardly extending pin 233 which is movably disposed in a slot 235 in the front plate 80.

Rearwardly of the moving lens assembly 210 is the left shutter opening blade 66, described herein above. Thus, the shutter and focus lens assembly includes all the above-described components extending from the from plate 80 to the housing 20. A front lens 240 is adapted for snapping into a circular retainer portion 242 of the front plate 80, the retainer portion 242 including circular walls 244 and leaf springs 246 with hook portions 248 which snap over a rib 250 on the periphery of the front lens 240. Similarly, a rear lens 260 is snapped onto the rear of the housing 20 over opening 26.

In FIG. 3, there is shown an assembly of the various components shown in FIGS. 1A–1C and described briefly hereinabove. In FIG. 3, the front lens 240, the motor 86 and the front plate 80 have been removed to show various internal components of the assembly in their assembled positions. FIG. 3 illustrates the positions of the components in a "home" position, that is, when the camera is not in active use, as when the camera is in storage, in transit, or simply being held by an operator.

Referring to FIG. 3, it will be seen that the beam actuator 122 is positioned such that the right shutter opening blade 52 and left shutter opening blade 66 are completely blocking the housing opening 26 (FIG. 1C). The beam actuator 122 is held in the position shown in FIG. 3 by the pawl 148, which is biased by the wire spring 202 radially outwardly from the center of the beam actuator 122, against the boss 140 (FIG. 1B), to keep the beam actuator 122 from rotating clockwise. The lens frame portion 212, which is spring biased to the left, as viewed in FIG. 3, interfaces with the beam actuator 122 at lever 132 to keep the beam actuator 122 from rotating counter-clockwise.

Figure 4:
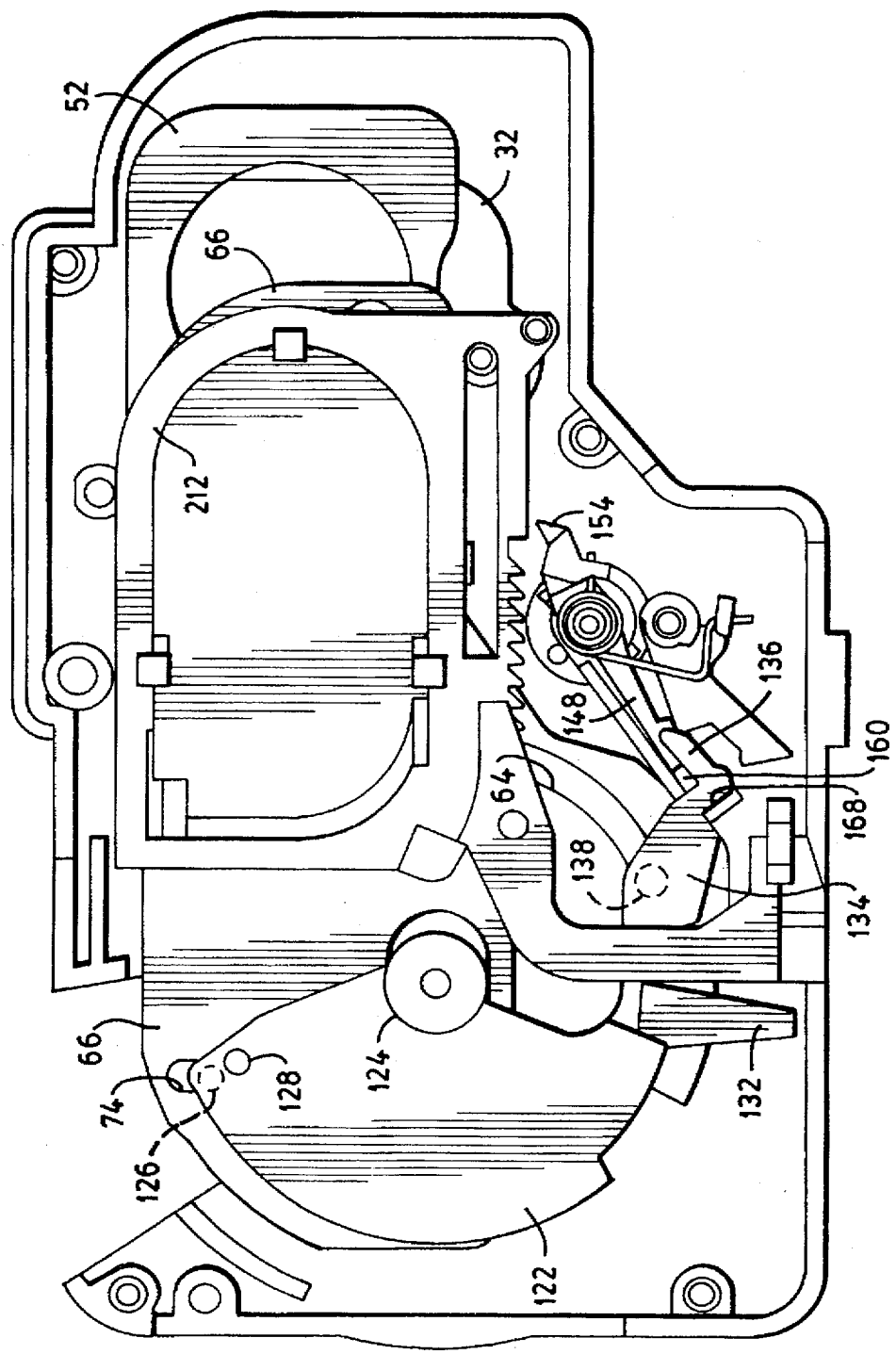
FIGS. 4–17 are similar to FIG. 3, but illustrative of the sequence of operative positions of various components of the assembly during an operative cycle.

Upon actuation of a picture-taking cycle by an operator, as by pressing a shutter button (not shown), an "am I home" check is automatically performed. The check incurs an attempt to rotate the beam actuator 122 clockwise into the beam stop nest 168. If rotation does not occur, the system "knows" it is in its home position (FIGS. 3 and 4). If rotation of the beam actuator does occur, then the system is automatically put through a recovery sequence.

Figure 5:
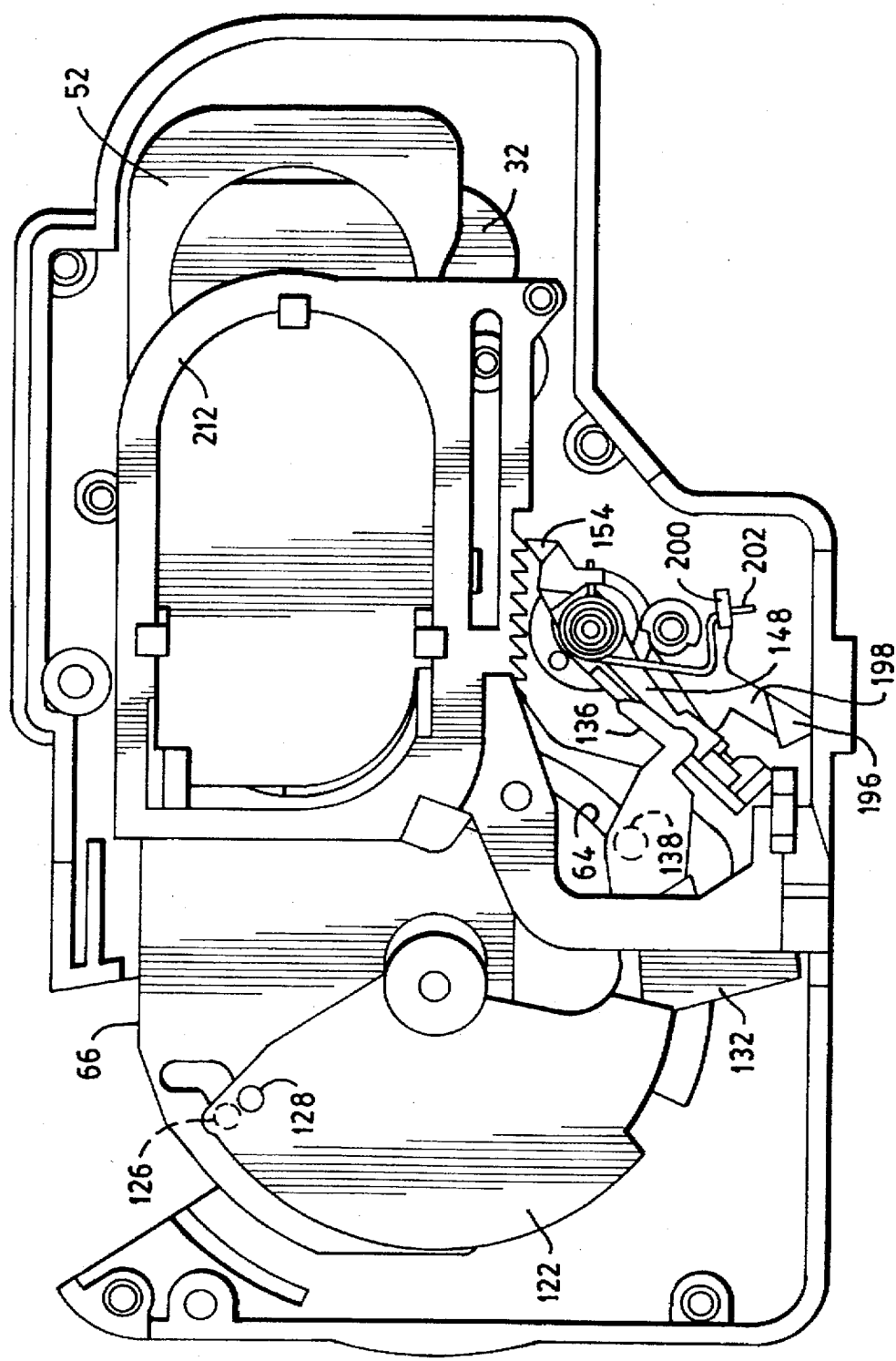

Referring to FIG. 5, at this point the shutter electronics (now shown or described herein) have determined what focus zone and aperture opening dynamics to use. The motor begins to rotate the beam actuator 122, counter-clockwise. Inasmuch as the pawl 148 is spring biased outwardly from the center of the beam actuator 122, the pawl swings outwardly.

Figure 6:
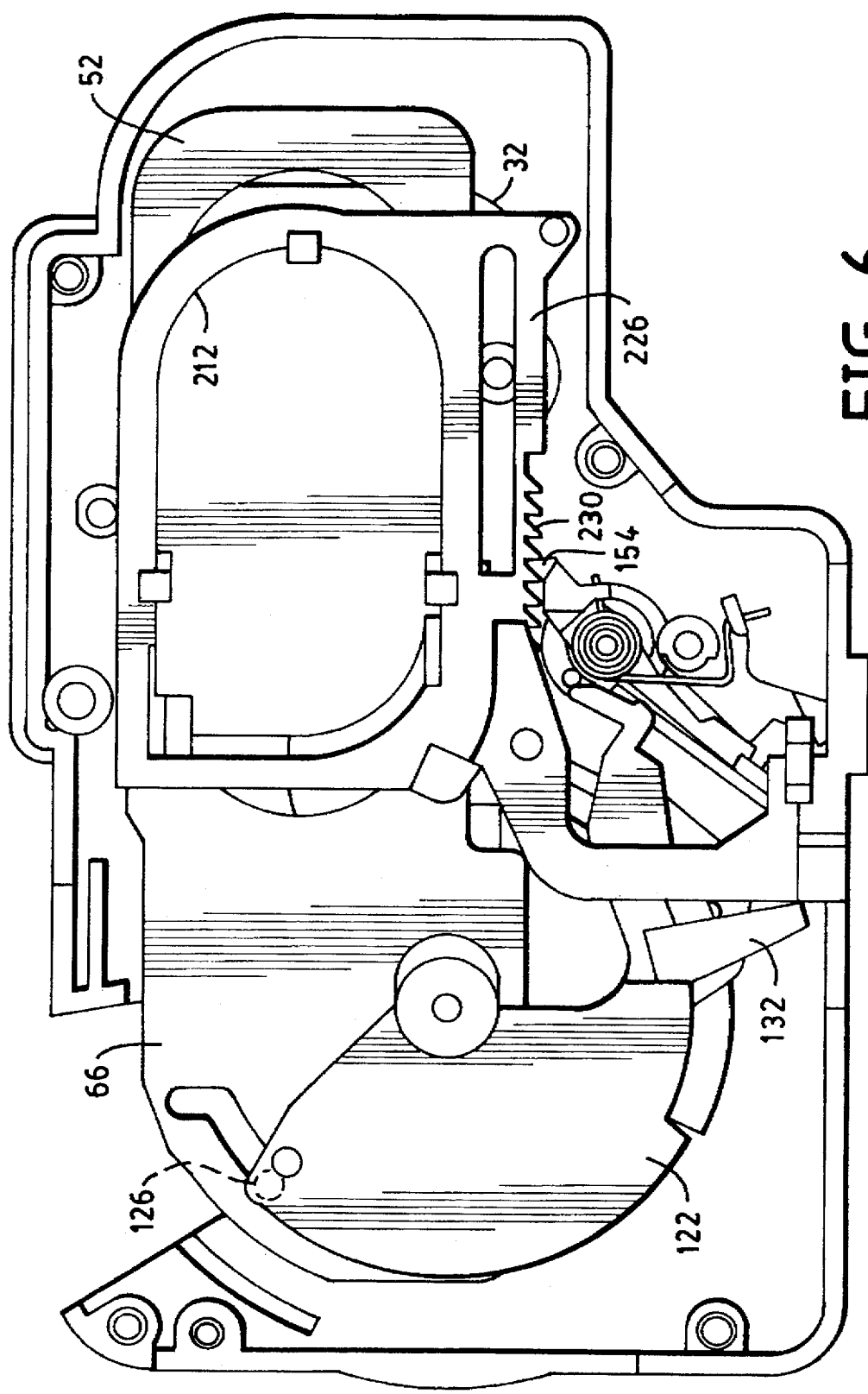

In FIG. 6, the beam actuator 122 has been rotated counter-clockwise further having the arm 132 of the beam actuator 122 rotate and push the moving lens frame 212 into a focus position to a point at which the pawl detent 154 is engaged with the moving lens frame lower portion ratchet teeth 230. The left and right opening blades 66, 52 have not yet translated, inasmuch, as the slots 70, 64 in the blades 66, 52, respectively, are radial slots disposed around the center of rotation. Thus, the beam actuator 122 is adapted to rotate counter-clockwise without moving the blades 52, 66, the beam actuator post 126 riding in the grooves 72 and 44, and post 138 riding in groove 64.

Figure 7:
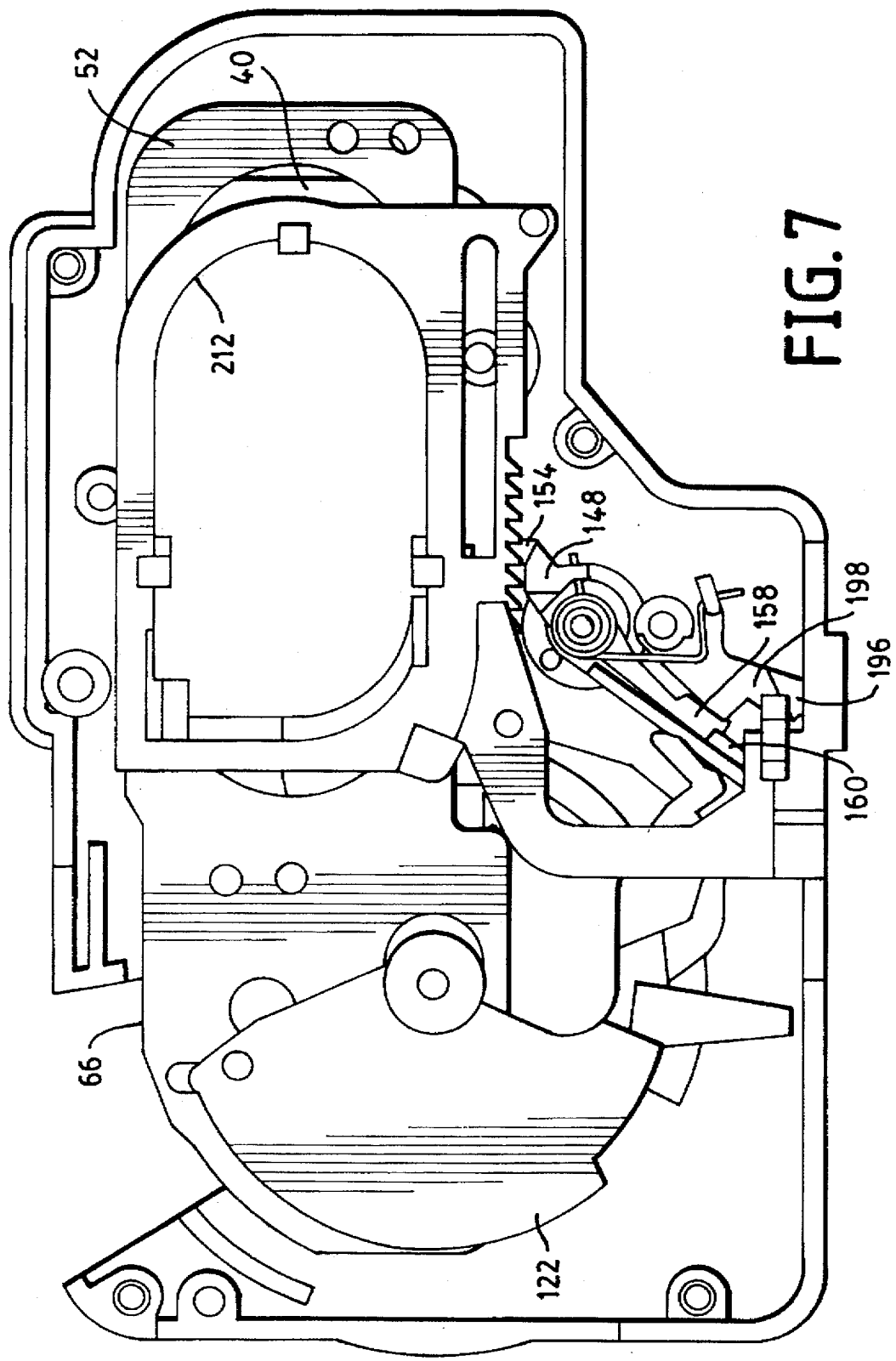

With the moving lens frame portion 212 latched in an appropriate position (FIG. 7) by the pawl detent 154, the beam actuator 122 is rotated clockwise back through its original position, as shown in FIGS. 3 and 4. The beam actuator 122, as shown in FIG. 7, is not at rest, but traveling clockwise at a speed desired for a proper exposure opening curve. The flange portion 160 of the pawl enlarged portion 158 is latched out of the path of the beam actuator 122. The blades 40, 52 and 66 remain closed over the housing opening 26 (FIG. 1C).

Figure 8:
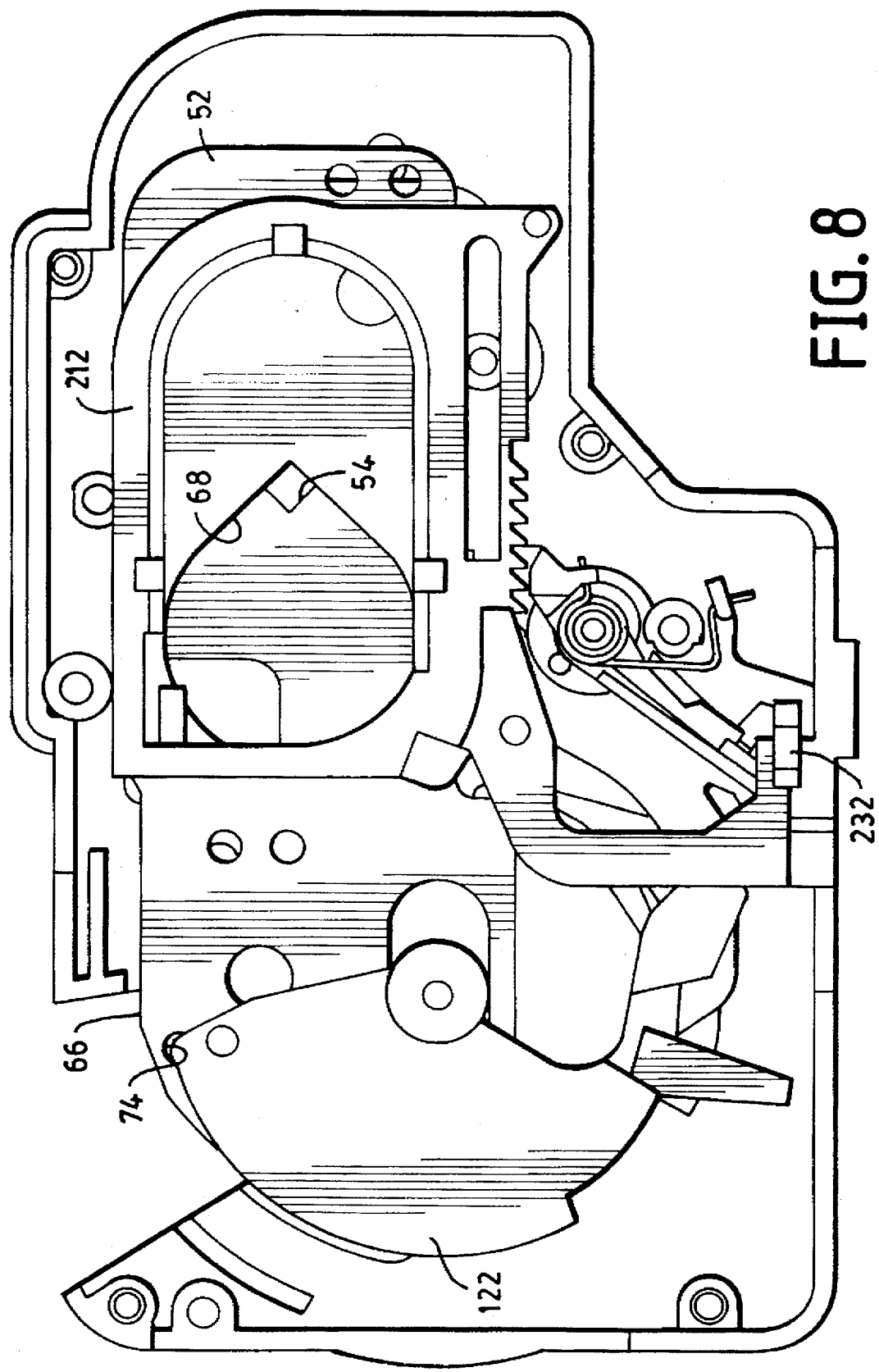
Figure 9:
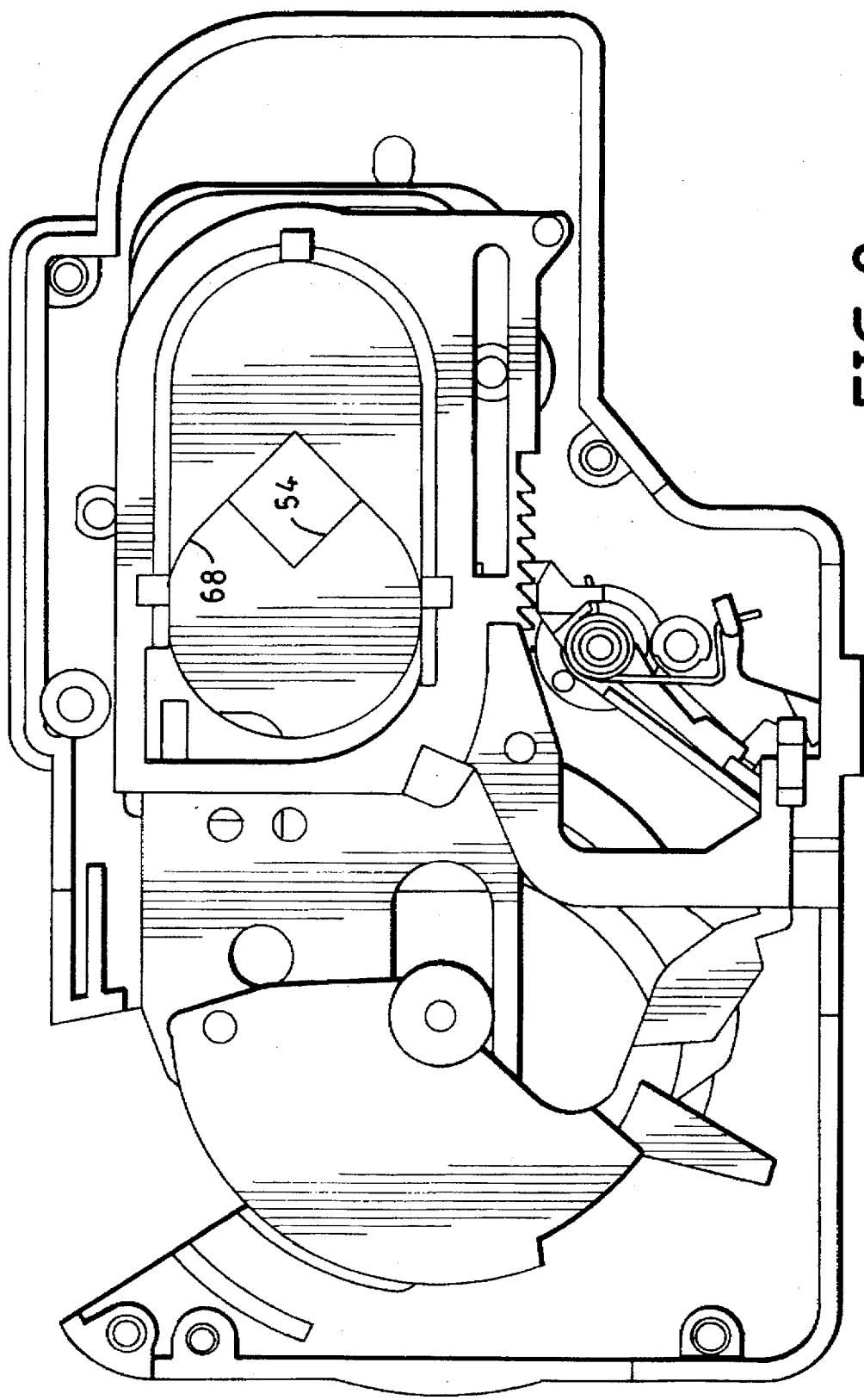
Figure 10:
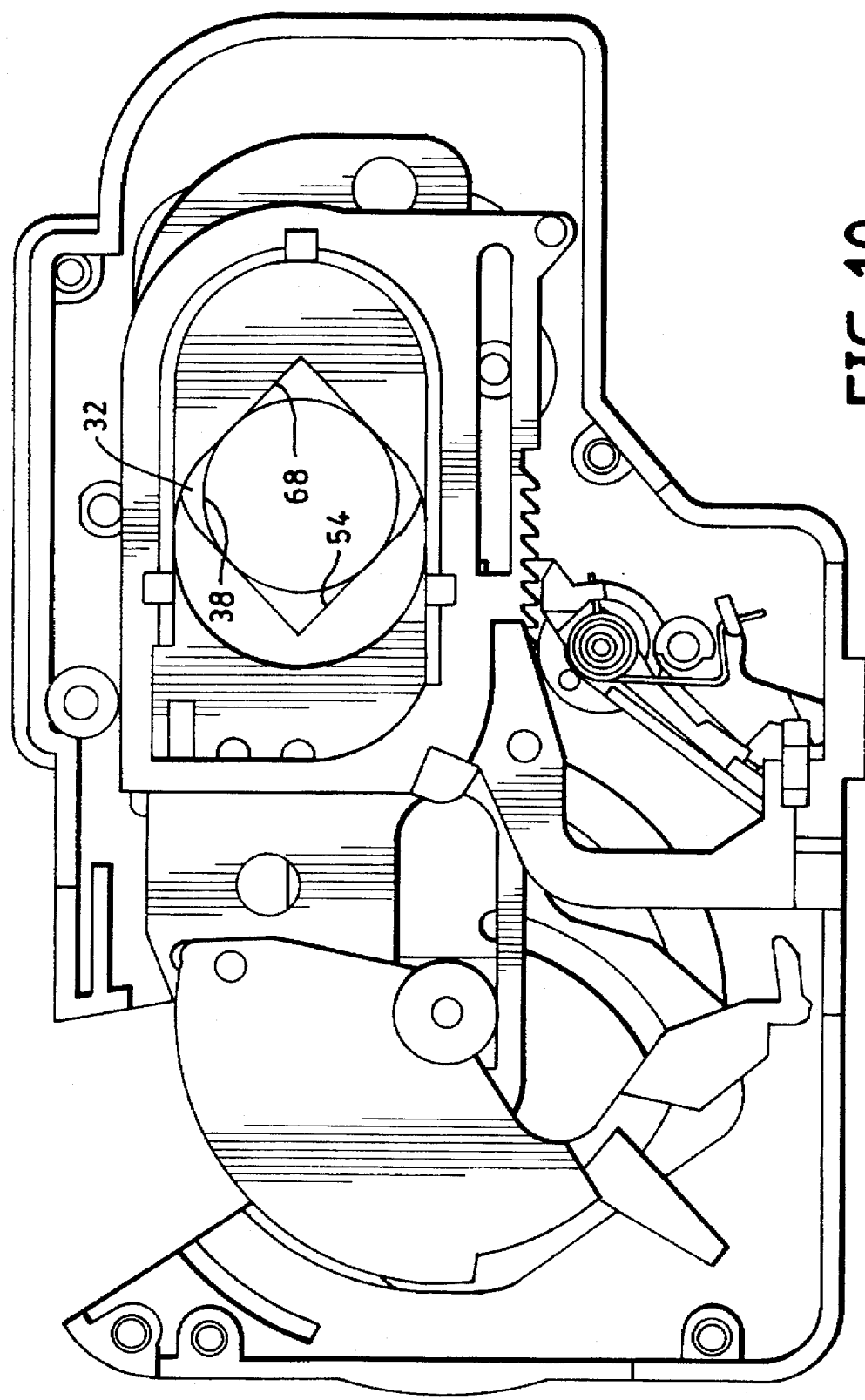

In FIG. 8, there is shown the beam actuator 122 having rotated further clockwise to a point wherein the right shutter opening blade orifice 54, the left shutter opening blade orifice 68, and the shutter opening blade orifice 42 (not visible in FIG. 8, but shown in FIG. 1C) have begun to overlap, to allow light to pass through the housing opening 26. The lens element 214 has been removed for clarity. In FIG. 9, the blade orifices 54, 68 and 42 have overlapped further to provide an enlarged opening and, in FIG. 10, the opening created by the orifices 54, 68 and 42 has reached maximum and is aligned with aperture 38 in the optical stop plate 32 which, in turn, is aligned with the housing opening 26 (FIG. 1). In this position, the beam actuator 122 has rotated clockwise to a point at which the circular portions of the orifices 54, 68 and 42 are aligned with the aperture 38. The blades 40, 52 and 66 may remain in this position some period of time and then close, as in the presence of dimly lit scenes, or may begin closing immediately.

Figure 11:
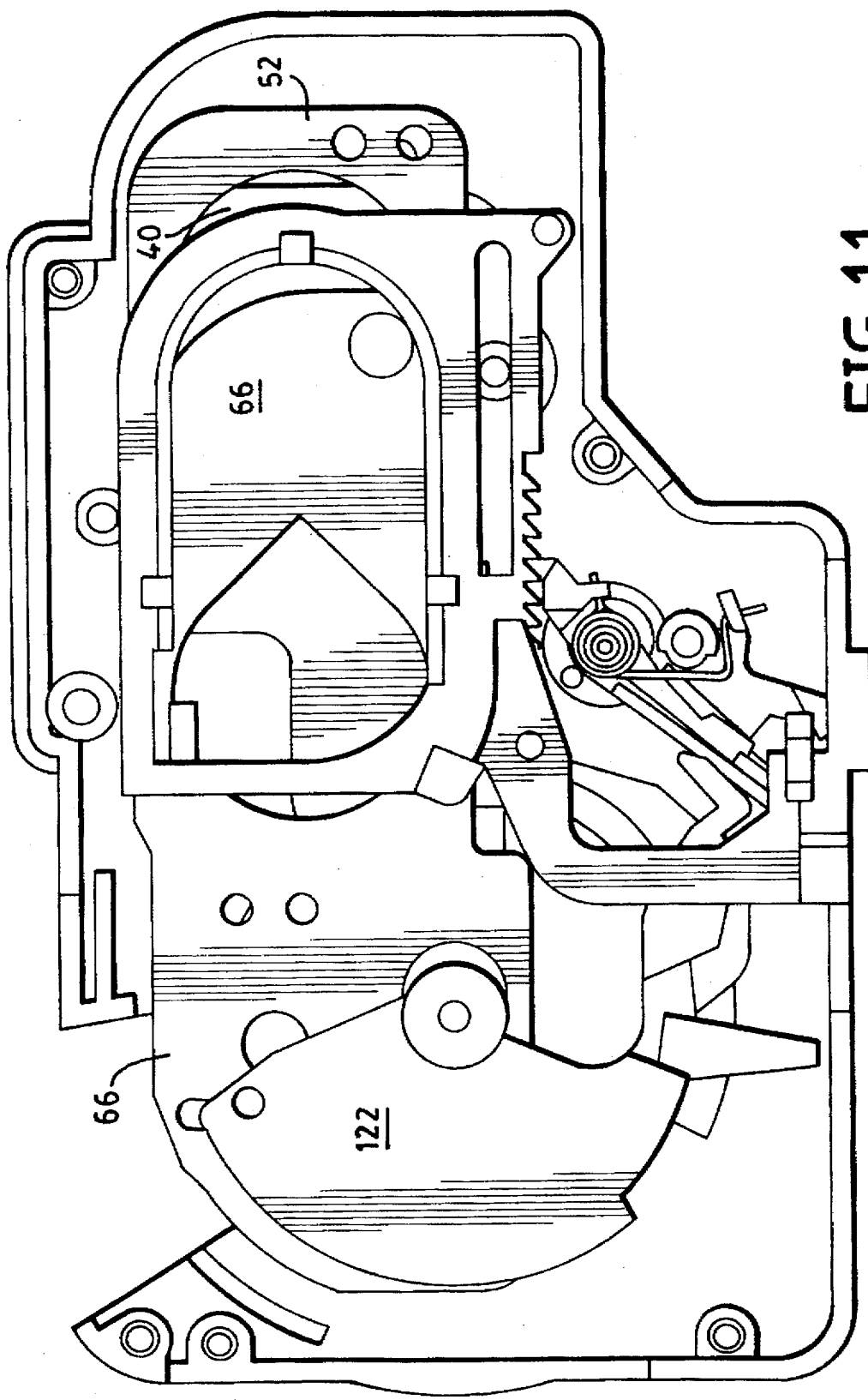

FIG. 11 illustrates the beam actuator 122 rotating counter-clockwise again, and the blades 40, 52 and 66 fully closed, ending the exposure portion of the cycle of operation.

Figure 12:
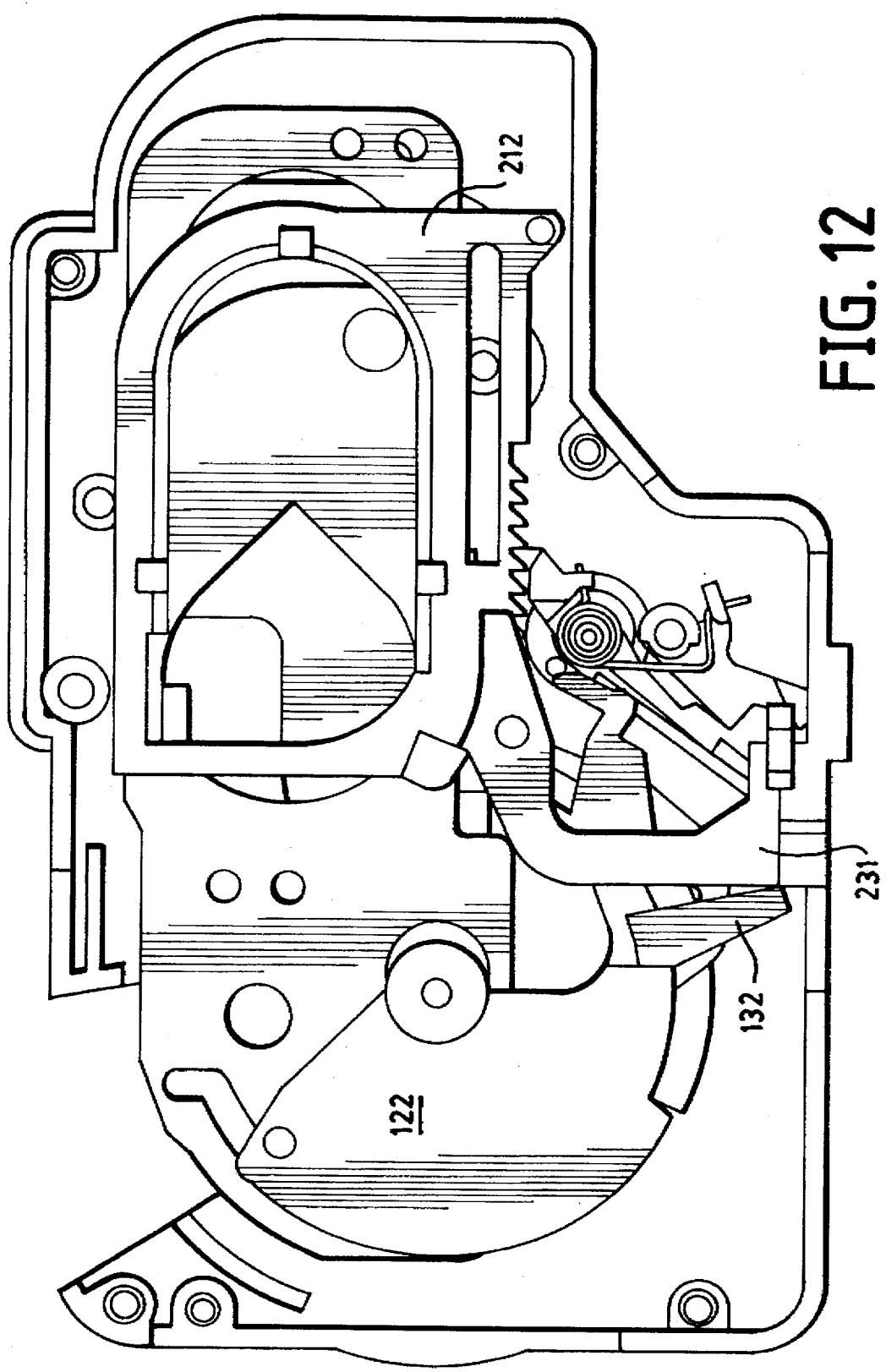
Figure 13:
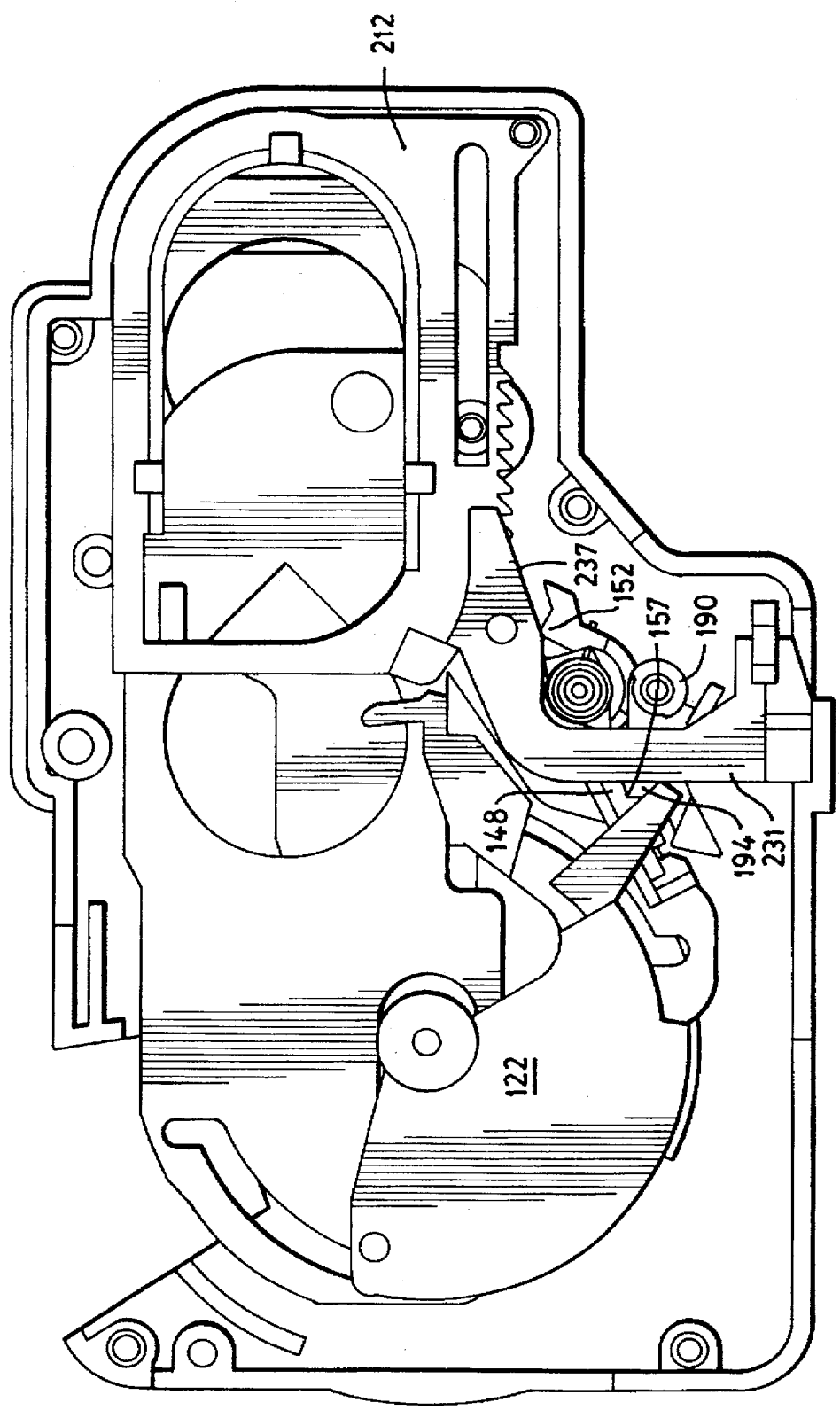

In FIG. 12, the beam actuator 122 is shown having rotated further in the counter-clockwise direction, with the lug 132 of the beam actuator 122 engaging the arm 231 of the moving lens frame portion 212. In FIG. 13, it will be seen that continued counter-clockwise rotation of the beam actuator 122 has pushed the moving lens frame portion 212 to its furthest rightward position. In this position, a reset cam 237 on the arm 231 of the frame portion 212 has cammed the pawl detent 152 into a clockwise rotated position to permit the latching tip 194 of the pawl latch 190 to enter the latching notch 157 in the pawl 148. Pawl latch 140 is loaded clockwise by spring 202. The pawl 148 is thereby cocked out of the way of the moving lens frame members' ratchet teeth 230, permitting the frame portion 212 freely to follow the beam actuator 122 through subsequent clockwise rotation.

Figure 14:
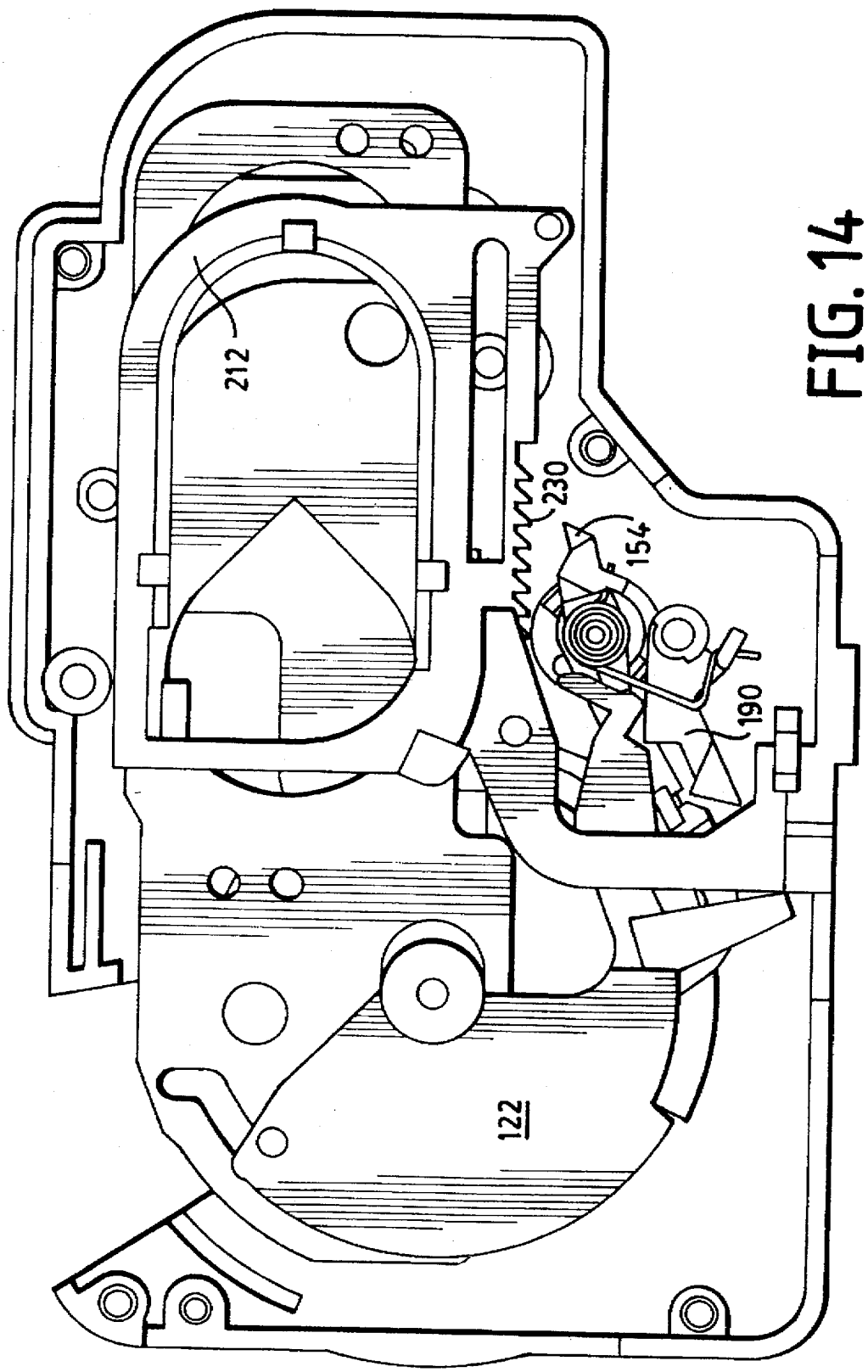

Referring to FIG. 14, the lens frame portion 212 and the beam actuator 122 are shown returning "home". The beam actuator 122 is rotating clockwise again with the lens frame portion 212 following under bias from the extension spring 91 (FIG. 1A). Inasmuch as the beam actuator 122 is "easing" the lens frame portion 212 back "home", there is no reset slamming or snapping of the lens frame portion 212 into home position. The pawl detent 154 is held in a position removed from the lens frame ratchet teeth 230 by the pawl latch 190, enabling the lens frame portion 212 to he eased home under spring pressure.

Figure 15:
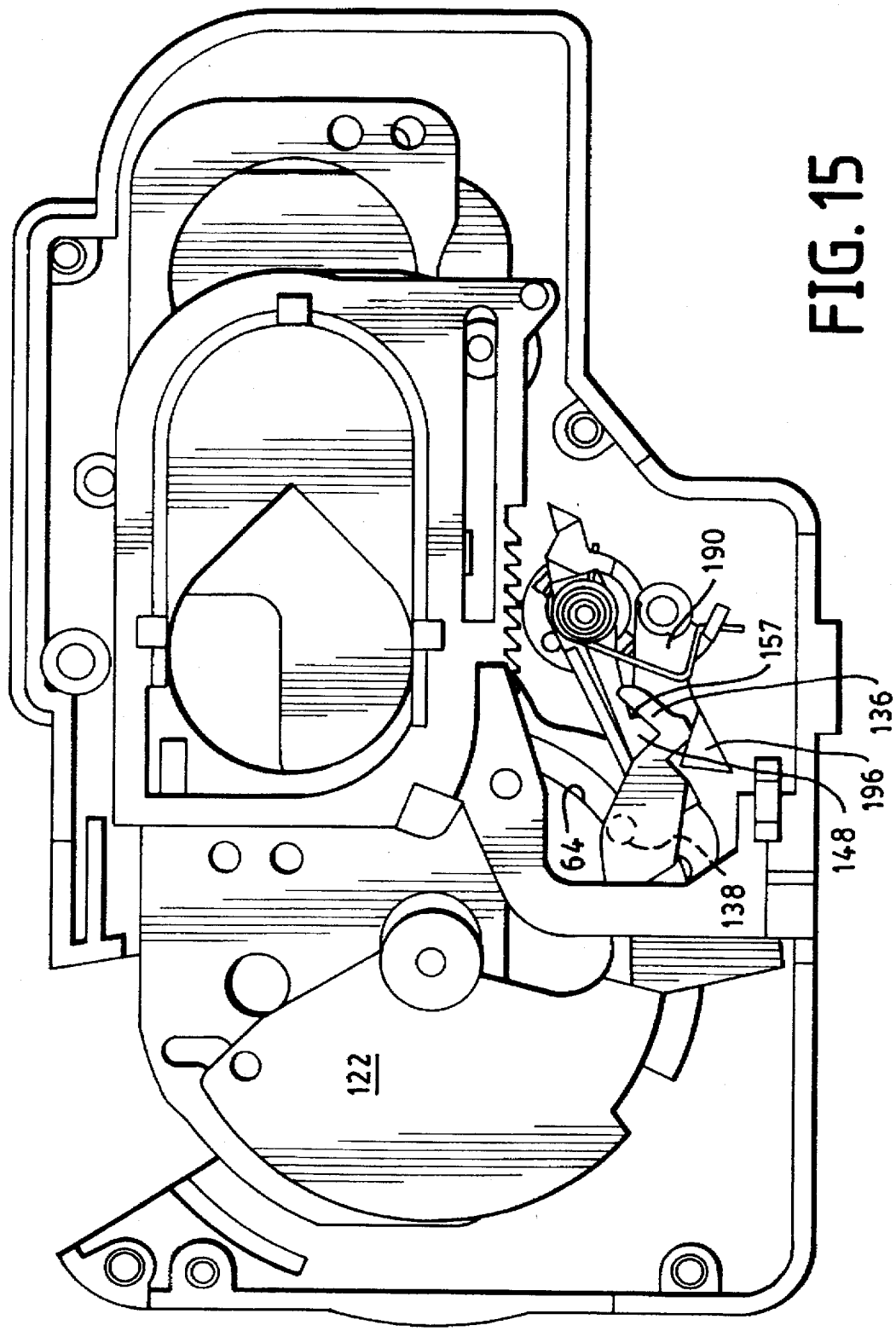
Figure 16:
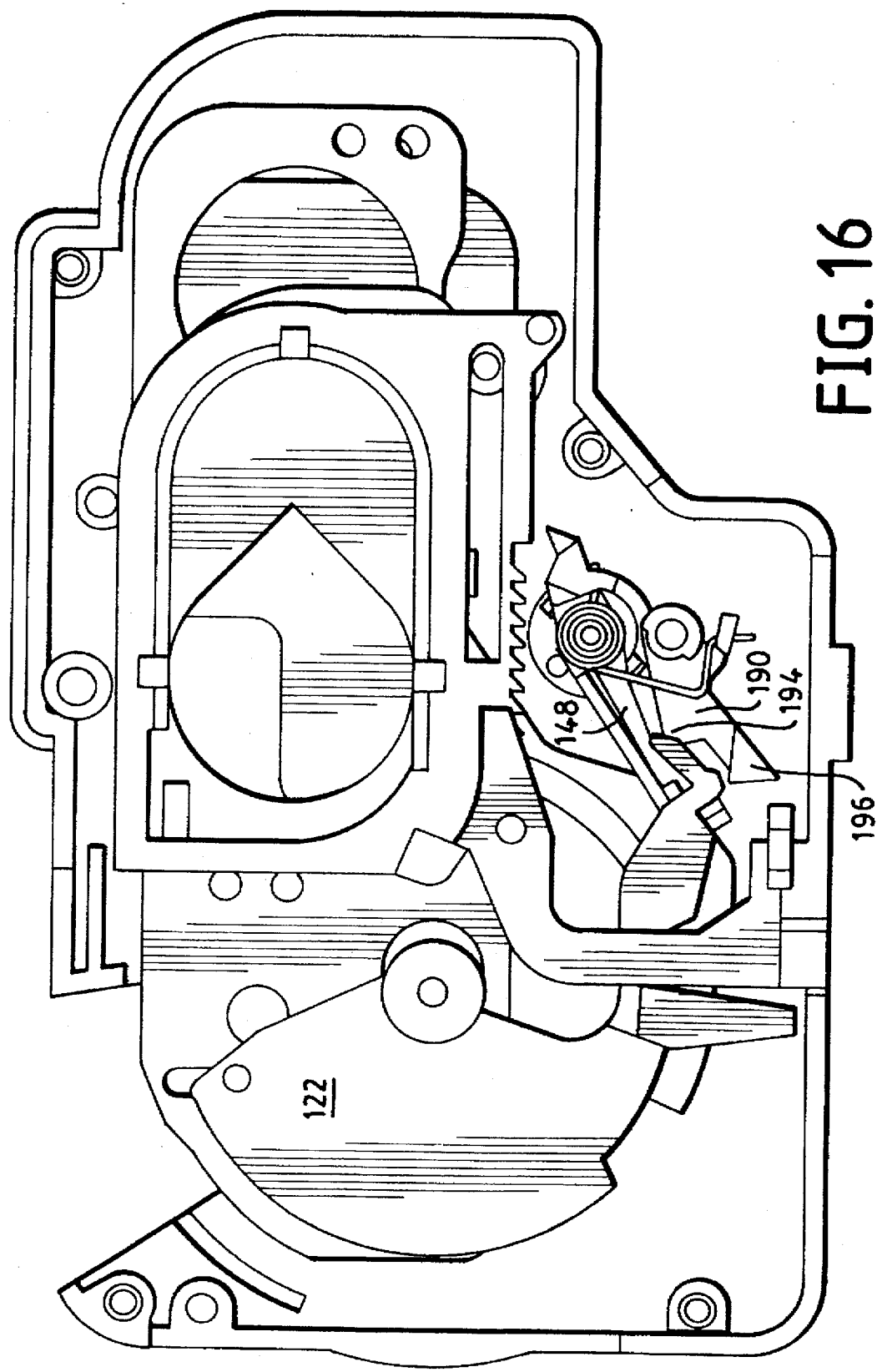

In FIG. 15, the beam actuator 122 has rotated clockwise to the point at which the beam actuator flange 136 contacts the pawl latch cam portion 196. As the beam actuator 122 rotates further clockwise, the latching tip 194 of the pawl latch 190 is cammed out of the pawl latching notch 157 (FIG. 16), allowing the pawl 148 to rotate counter-clockwise about its center of rotation.

Figure 17:
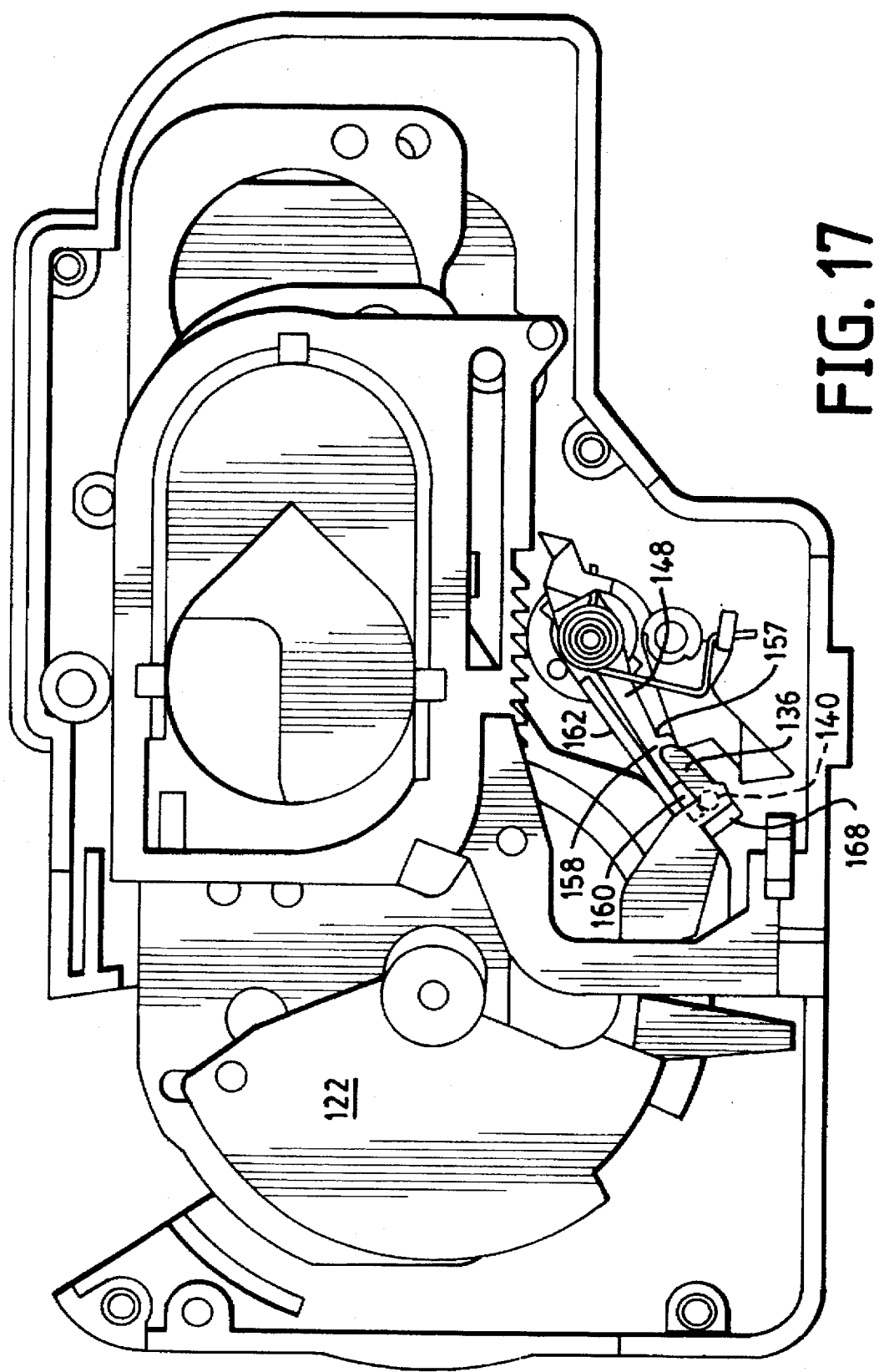

In FIG. 17, the beam actuator 122 has rotated clockwise such that the flange 136 thereof has come in contact with the beam stop flange portion 168. The pawl 148 has rotated counterclockwise to a point at which the pawl is in contact with the pin 140 (FIG. 1B) on the beam actuator 122. The aforementioned "home" check is performed at this point. If the home check passes, the system is ready for another cycle. If the home check fails, a recovery cycle automatically is performed and another "home" check run again, until a "pass" is obtained.

Thus, there is presented a camera shutter and focal lens assembly including a single drive means which is mechanically connected to the shutter mechanism and to the focal lens mechanism, and operates to drive both mechanisms substantially simultaneously. The assembly requires a minimum of electronic inputs and can he provided in modular form, so as to be adapted for use in a number of different cameras designs. It is to he understood that the present invention is by no means limited to the particular construction herein disclosed and/or shown in the drawings, but also comprises any modifications or equivalents within the scope of the claims.

Having thus described our invention, what we claim as new and desire to secure by Letters Patent of the United States is:

1. A camera shutter and focus lens assembly, said assembly comprising: a motor having a drive shaft; actuator means including a rotary beam actuator means being coupled to said drive shaft; a movable lens means and at least a fixed focus lens means, said movable lens moving in directions which translate across an optical axis of the lens assembly; and, shutter means including a first and second shutter blade mechanism for cooperating to define an opening to permit light to pass therethrough, each one of said blades is coupled to said rotary beam actuator means and moving in a plane which intersects an optical axis of the lens assembly means on said rotary beam actuator means, so that when rotated in one rotative direction is engageable with said movable lens in order to move said movable lens to a preselected position in order to effect a selected focusing relationship, and when rotated in the opposite rotative direction is engageable for actuating said blades for effecting a cooperation to define a light passing opening.

2. The camera shutter and focus lens assembly according to claim 1, wherein said beam actuator means includes a post extending therefrom which is generally parallel to said drive shaft, a post disposed in a first groove on said first shutter blade and a second post disposed in a second curved groove on said second shutter blade, such that rotation of said beam actuator means moves said first and second grooves in said shutter blades, respectively, until reaching portions of said grooves at which time said posts move said shutter blades to define and close said opening.

3. The camera shutter and focus lens assembly according to claim 1, wherein said actuator means includes a biased pawl means which selectively restrains said rotary beam actuator means.

* * * * *